US008857711B2

(12) United States Patent
Simske et al.

(10) Patent No.: US 8,857,711 B2
(45) Date of Patent: Oct. 14, 2014

(54) TRACKING CUSTOMER LOYALTY INFORMATION USING AN INCREMENTAL INFORMATION OBJECT

(75) Inventors: Steven J. Simske, Fort Collins, CO (US); A. Marie Vans, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/235,864

(22) PCT Filed: Sep. 8, 2011

(86) PCT No.: PCT/US2011/050792
§ 371 (c)(1),
(2), (4) Date: Jan. 29, 2014

(87) PCT Pub. No.: WO2013/036227
PCT Pub. Date: Mar. 14, 2013

(65) Prior Publication Data
US 2014/0231510 A1    Aug. 21, 2014

(51) Int. Cl.
*G06K 5/00*    (2006.01)
*G06Q 30/02*    (2012.01)

(52) U.S. Cl.
CPC ..................... *G06Q 30/02* (2013.01)
USPC ........................................ 235/380

(58) Field of Classification Search
USPC ........... 235/380, 383, 435, 462.15; 705/14.35
See application file for complete search history.

(56) References Cited

U.S. PATENT DOCUMENTS

| | | | | |
|---|---|---|---|---|
| 6,142,371 A * | 11/2000 | Oneda | ........................ | 235/380 |
| 6,292,786 B1 * | 9/2001 | Deaton et al. | ............. | 705/14.25 |
| 6,415,261 B1 * | 7/2002 | Cybul et al. | ............... | 705/14.23 |
| 7,578,443 B1 * | 8/2009 | Harris | ...................... | 235/462.01 |
| 2004/0249703 A1 * | 12/2004 | Weiszfeiler | .................... | 705/14 |
| 2009/0250512 A1 | 10/2009 | Deck et al. | | |
| 2010/0179857 A1 | 7/2010 | Kalaboukis et al. | | |
| 2010/0262482 A1 | 10/2010 | Bous | | |
| 2011/0153407 A1 | 6/2011 | Walker et al. | | |

FOREIGN PATENT DOCUMENTS

JP       2010086135 A    4/2010
KR    10-2007-0019923 A    2/2007

OTHER PUBLICATIONS

Gigoro, Tom, "Moseycode Symbology (first revision)," Available at http://www.tomgibara.com/android/moseycode/symbology, accessed on Jul. 27, 2011).

* cited by examiner

*Primary Examiner* — Seung Lee

(57) ABSTRACT

A method for tracking customer loyalty information using an incremental information object (IIO) includes capturing an information object (IO), wherein the IO include a number of tiles, and wherein the number of tiles include a standard code. The method also includes analyzing the IO to identify the standard code and analyzing the IO to determine if the IO is an IIO containing a progressive code, wherein the progressive code does not interfere with the reading of the standard. The method further include confirming the progressive code and, if the progressive code is successfully confirmed, obtaining customer loyalty data from the progressive code within the IIO.

15 Claims, 7 Drawing Sheets

200

300

(A)

(B)

400

TRACKING CUSTOMER LOYALTY INFORMATION USING AN INCREMENTAL INFORMATION OBJECT

BACKGROUND

Products may include both physical and information-containing items, such as produce, documents, labels, books, software, images, and the like. During the lifecycle of the product, it may progress through a workflow, such as from a manufacturer, through a chain of distributors, and on to a consumer. As used herein, a workflow is a defined set of stages, usually with a task at each stage, which a product must pass through during its lifecycle. For example, a document may be drafted by a first person, then flow through a number of different editors, prior to being issued to customers or clients in final form. As another example, a manufacturer may package a product for sale to another manufacturer, such as a bundled software package to be sold with a computer.

A bar code may be associated with a product for numerous reasons. For example, a bar code may help protect an associated product from counterfeiting and other falsifications. The same bar code may be used throughout the workflow to identify the product. However, this approach does not enable one to monitor the status of the workflow via the bar code. Multiple bar codes may be added, for example, by each entity within a workflow. This may be used to identify the product as it moves from one stage to the next in its workflow. For example, multiple barcodes may be used to confirm the identity of the last party to handle the product. However, the use of multiple bar codes may take a substantial amount of space.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Figure 1:
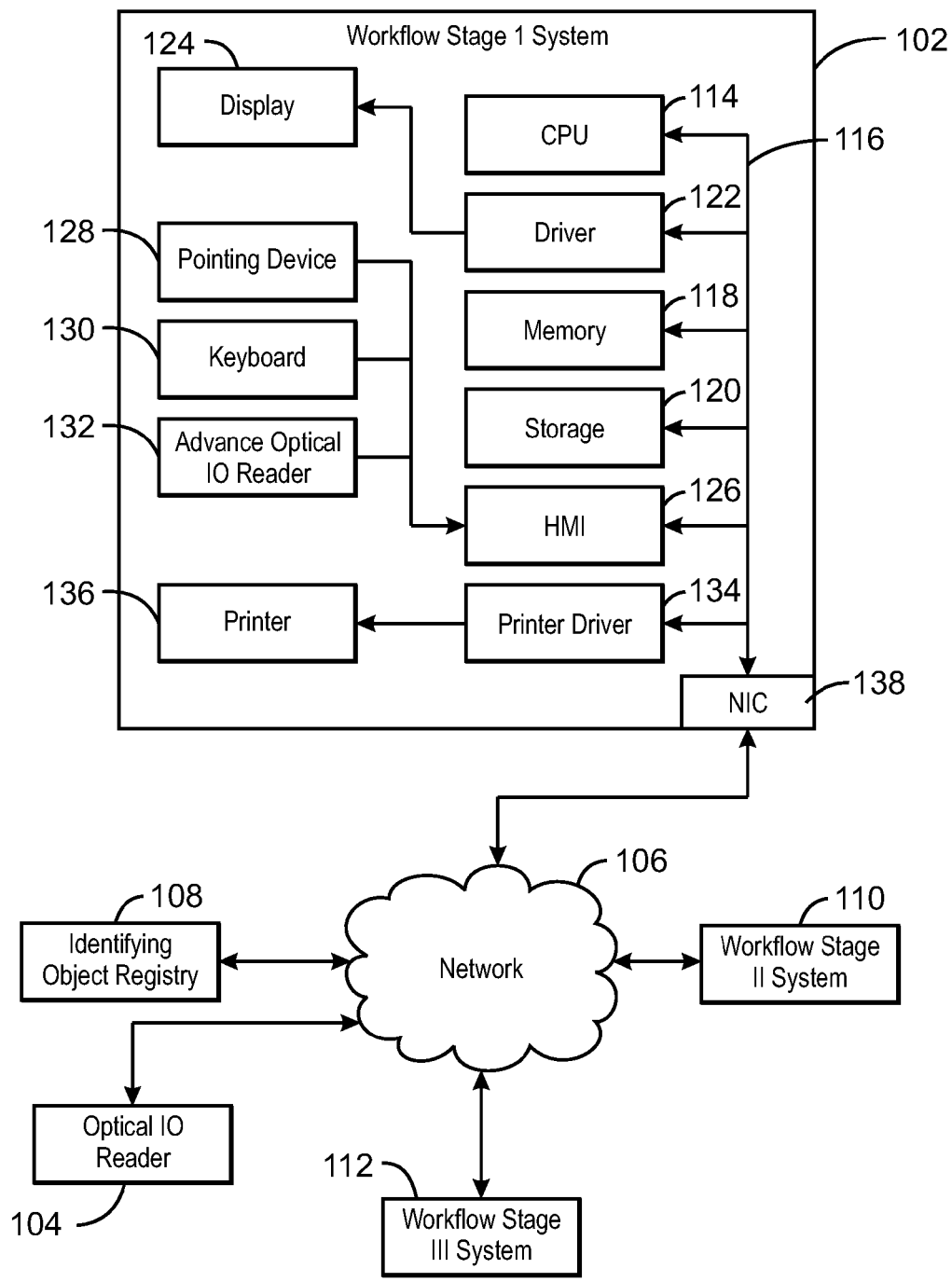
FIG. 1 is a schematic diagram of a system for tracking customer loyalty information using an incremental information object (IIO), in accordance with an example.

Customer loyalty information is often desired by companies to keep track of how often certain customers purchase the company's products or which products certain customers purchase. Customers are increasingly connected, using their mobile devices to compare costs, find locations for their products, and take part in customer loyalty programs. Many customer loyalty programs consist of distributing coupons to loyal customers, but other methods for rewarding frequent customers are becoming increasingly popular. Customer loyalty data may be tied to a mobile device used by the user to take the camera pictures. The loyalty program may be based on the posted barcode being progressive, so that the customer's mobile device compares the current barcode interpretation to the previous state of the barcode and can, with a selected level of statistical probability, ascertain that the customer also clicked on the previous barcode. The customer may be rewarded for multiple visits with any of a variety of feedback, for example, points, virtual dollars, coupons, free items, or points transfer, among others. In addition, the company owner may be rewarded with loyal customers.

Examples discussed herein may be used to adapt an information object (IO) to generate an incremental information object (IIO) or to overwrite a current IIO to generate a new IIO during a workflow. As used herein, an "IO" is any type of standard mark that is used to convey information about a product or service, such as a barcode. The IO is static and may be read by a standard optical IO reader. In addition, as used herein, an IO that holds additional information is termed an "IIO." The IIO that is generated may be some accepted standard mark reader-friendly, meaning that it may still be recognized by an already publicly available reader and reading software, or firmware optical IO reader, as the initial state for the IO, even if it contains additional progressive information, for example, in the form of colors. In this manner, the functionality of the initial standards-compliant payload of the IO is not compromised or altered by the presence of the progressive information.

The IIO may be used to track customer loyalty information. For example, an IO for a particular product may be adapted to hold more information, and then progressively overwritten by the company each time that a customer purchases a product. In addition, an IO for a particular product or service at a store or restaurant may be progressively overwritten to include information about coupons or weekly specials, for instance. As used herein, "adapt" indicates that the amount of potential information content in the IO may be increased to match the needs of the workflow. In general, the information density of an IO may be termed the complexity of the IO. Thus, the complexity of an IO may be changed to generate an IIO to accommodate changes in the document's set of stages, security needs, and the like, and will work for both print-scan and wholly electronic workflows. In addition, an IIO may be changed to generate a new IIO with a higher degree of information content.

The adaptability may be provided by changing the number of colors or grayscale levels allowed for the individual data module, or tiles, in the IO. For example, additional colors or intensities may be recorded in the IO. In an example, very light colors, i.e., of intensities similar to that of very light gray, may be added to light tiles. The added colors may be very light so that the IO may still be readable by a standard optical IO reader, even though progressive information has been added to the IO. Conversely, in another example, very dark colors may be added to dark tiles, so that the IIO may still be readable by a standard optical IO reader as the IO.

This additional progressive information may be decoded using a computer-implemented software program that is to read a particular structure of progressive code within an IIO. In an example, the software program may be embedded in an advanced optical IO reader. The advanced optical IO reader may contain software that is adapted to recognize smaller differences in intensity than a standard optical IO reader. In addition, the advanced optical IO reader may contain additional software that is adapted to interpret changes in hue as being indicative of changes in the information content of the IIO.

As described herein, a workflow is a defined set of stages, usually with tasks at each stage, through which a product may pass during its lifecycle. A product, when initiated into a workflow, may begin with only an IO or other standard mark on it. For example, a workflow may include a series of stages through which a product may pass in order to convey a progressively increasing amount of customer loyalty data for a particular customer. In another example, the workflow is a process during which documents, information, tasks, or products are passed from one participant to another for action or informative purposes, according to a set of procedural rules. Workflows may include any number of actions for processing the product. For example, a workflow for an image may include actions such as quality assurance, authentication, forensics, and the like. A supply chain workflow may include actions such as tracking, tracing, inspection, shipping, receiving, or recall, among others. In addition, a workflow may be a series of product purchase events by a particular customer or, more generally, a series of events in which a particular customer interacts with a particular company, for example, to gain customer loyalty points, or rewards, for supporting or purchasing services or products. Thus, a workflow may be defined as a set of tasks associated with generating, implementing, producing, or distributing a product. In addition, a workflow may be conditional. In other words, a workflow may progress to different possible stages depending on the desired progression for each individual case.

In general, an IO is a feature or mark carrying information that may be useful for tracing, tracking, state indication, data embedding, authentication, identification, or any other operations that may be used to provide information as a product progresses through the stages of a workflow. As used herein, all of these operations are encompassed by the general term "confirming." The IO can maintain a size, a shape, or both, as the item moves through the workflow, even though information may be added at each stage of the workflow. The IO may be designed taking into account security needs, the type of readers available, and other concerns, such as branding, fraud prevention, robustness to damage, and the like. For example, the IO may include a binary barcode, in which the state of each tile in a field of tiles in a two dimensional matrix encodes a bit in a bitstream.

The IIO that is generated from an IO may be a two-dimensional or three-dimensional glyph or mark that can be incrementally overwritten throughout the workflow to form an identifying object having increasing data content at each stage. The IIO may also include a three-dimensional (3D) grayscale barcode, in which a field of tiles in a two dimensional matrix encodes information and a grayscale state is used to encode a third dimension at each tile. As another example, the IIO may include a 3D color barcode, in which a field of tiles in a two dimensional matrix encodes information and a color state is used to encode a third dimension, e.g., multiple bits, at each tile. In some examples, the IIO may be a standard barcode, such as a black and white universal product code (UPC), to which additional information is added in the form of colored lines that are not readable by a standard barcode reader, such as a point-of-purchase terminal.

The IIO may be a physical mark on a product, such as a printed document or a label on a package or other readily-messaged printer mark. Further, the IIO may be an electronic object in a document, which may be displayed as a mark on a viewing device. In this example, the IIO may be printed with the product and can appear as a mark on a first page of a document.

The IO or IIO may be read either from the physical object or from the viewing device using any image capture device, such as specialized handheld or mobile device, or a barcode reader. In some examples, a virtual barcode reader may be used to read the IO or IIO from an electronic document, without using a physical device. In some examples, a software object may locate and extract the image from an electronic document. As used herein, the term "optical IO reader" includes all of these devices or techniques.

FIG. 1 is a schematic diagram of a system 100 for tracking customer loyalty information using an incremental information object (IIO). The workflow may start at a first stage system 102. Any number of systems for stages in the workflow may be included, depending on the specific workflow. In addition, a standard optical IO reader 104 may be used to image the IO and send the image through a network 106 to an identifying object registry 108 to determine the code within the IO. The identifying object registry 108 may then send the code information directly back to the optical IO reader 104. The optical IO reader may 104 may also operate independently of the system 100 by scanning and reading an IO without sending the IO image to the identifying object registry 108.

The network 106 may be a local area network (LAN), a wide area network (WAN), or the Internet, and may include both public and private network segments, such as virtual private networks (VPN). In an example, the standard optical IO reader 104 may be a mobile device or imaging device capable of behaving as a standard optical IO reader 104, while simultaneously sending the IO image through the network 106 to the first stage system 102 to be analyzed for progressive information. In another example, the standard optical IO reader 104 may be used to obtain a non-progressive IO that may be sent through the network 106 to the first stage system 102, where it may be altered to become an IIO through the addition of very light colors to tiles within the IO.

The first stage system 102 may access an identifying object registry 108 over a network 106 to obtain additional information about the IO, such as rules for increasing the complexity, or information density, of the IO through the use of progressive color scales. Other stages of the workflow may have associated systems, such as the stage two system 110 and the stage three system 112 illustrated in FIG. 1. The first stage system 102 may be used either to coordinate the physical transfer of a product to the second stage system 110 or to directly transfer a product in electronic form. Similarly, the stage two system 110 may transfer or coordinate the transfer of the product to the stage three system 112. At each stage, information may be sent to the next stage's system to confirm the IO. For example, the information may include the rules used to increase the complexity of the IO at an earlier stage in the workflow with progressive color scales, or any other rules that may be used to create an IIO from an IO. Stages, security levels, and the like, may be added in the workflow by increasing the complexity of the IO. In an example, the system at a particular stage can increase the amount of information stored within the IO by communicating with the identifying object registry 108. In another example, the amount of information stored within the IO may be increased by following rules initially issued by the identifying object registry 108.

Further, in an example, each stage of a workflow may correspond to an action by a particular customer. For example, the first stage system 102 may be activated when a particular customer purchases a product from a company. The first stage system may then update the IO on the product to include customer loyalty information, forming an IIO. When the customer purchases another product from the same company, the stage two system 110 may initiate the encoding of additional customer loyalty information into the IIO on the product. This may be repeated every time the customer purchases a product from the company. This example may be particularly useful in the case of online shopping, since the IIO may be easily updated online for each individual customer.

In another example, the first stage system 102 of a workflow may correspond to the encoding of additional progressive information into an IIO at a particular location, such as a store or restaurant. This additional progressive information may include information about coupons, specials, or discounts, for example. The stage two system 110 and third stage system 112 may each correspond to an increasing amount of progressive information, so that the amount of information contained within an IIO may be increased as the IIO moves through the workflow.

Any of the stage systems 102, 110, and 112, or the optical IO reader 104 or identifying object registry 108, may include units to provide the functionality used to generate the IIO, as shown for the first stage system 102. These units may include a central processing unit (CPU) 114. The CPU 114 may include a single core processor, a multi-core processor, or a cluster of processors, for example, in a cloud computing configuration. The CPU 114 may communicate with other units over a bus 116, which can include a PCI bus, a PCIe bus, an optical bus, or any other suitable type of bus.

A memory 118, such as random access memory (RAM) or read-only memory (ROM), may be used to store operating programs and data to implement the methods described herein. As used herein, programs include machine readable code to direct a processor to implement various functions. Similarly, a storage system 120 may provide longer-term storage for data and programs. The storage system 120 may include, for example, a hard drive, an optical drive, a flash drive, a memory drive, and the like. The memory 118 and storage system 120 provide a non-transitory, computer readable medium for storing programs and data to implement the techniques described herein, as discussed further with respect to FIG. 7.

Other units may also be included to provide further functionality. For example, the stage systems may include a display driver 122 to drive a display 124, which may be used to display the product and the IIO. A human-machine interface (HMI) 126 can be used to interface with a number of input devices, such as a pointing device 128, including, for example, a mouse or touchscreen, among others. The HMI 126 may also provide an interface to a keyboard 130. In addition, the HMI 126 may provide an interface to an advanced optical IO reader 132, which may be used to image an IIO in order to obtain a progressive code. The advanced optical IO reader 132 may be a mobile or imaging device that is to read an IIO. A printer driver 134 may be used to interface with a printer 134 to print the IIO, the product, or both. The printer 136 may be a general-purpose unit, such as a laser printer or an ink jet printer, or may be a dedicated unit to overprint an IIO with additional information. In addition, a network interface card (NIC) 138 may be provided to permit the stage systems to access the network. The NIC 138 may include a wired Ethernet interface, a wireless network interface, or a mobile network interface.

A number of possible workflow patterns may be implemented on the system 100 discussed above. For example, the workflow may follow the patterns discussed with respect to FIG. 2.

Figure 2:
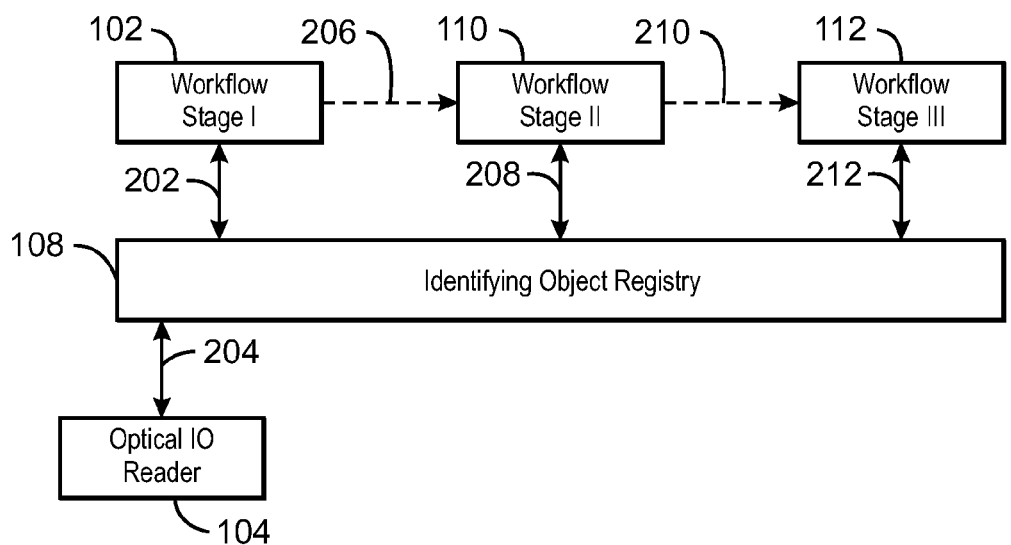
FIG. 2 is block diagram of a workflow using a centralized identifying object registry for confirmation of a product, in accordance with an example.

FIG. 2 is block diagram 200 of a workflow using a centralized identifying object registry 108 for confirmation of a product. If the registry-based workflow 200 is utilized, the first stage system 102 exchanges information used to generate an IIO from an IO with the identifying object registry 108, as indicated by arrow 202. The information 202 may include the rules used to increase the complexity of the IO through the addition of progressive color scales. In an example, the information 202 exchanged includes all of the information needed to write the IIO, with the identifying object registry 108 retaining all coding information. In an example, an optical IO reader 104 is connected to the identifying object registry 108 and sends the IO to the identifying object registry 108, as indicated by arrow 204. The identifying object registry 108 may analyze the IO image from the optical IO reader 104 to determine a code and send the information back to the optical IO reader 104, as also indicated by arrow 204. In another example, the identifying object registry 108 may send the code information obtained from the IO image to the first stage system 102.

At the next stage in the workflow 200, the second stage system 110 receives a package 206 of information from the first stage system 102. The package 206 may include a document and the associated IO. In the case of a physical product, the package 206 may be physically transferred from one stage to the next in the workflow. The second stage system 110 may then confirm the IO, for example, by decoding the image to form a bitstream including the code and then exchanging information 208, including the bitstream, with the identifying object registry 108 for confirmation of the information 208.

At any stage 102, 110, or 112 of the workflow 200, after confirmation of the previous code, the information content of the IO, or the IIO in later stages, may be increased by adding progressive color scales to the IO or IIO. This can be performed by communicating the requested change to the identifying object registry 108 and receiving instructions for changing the IO or IIO to include progressive information. Thus, the information 208 returned from the identifying object registry 108 may include information confirming the IO or IIO and information for generating a new IIO for the next stage of the workflow. In an example, the information 208 from the identifying object registry 108 may include all of the information used to form the new IIO, including all of the increases in information content.

To advance the workflow, the second stage system 110 sends a package 210 on to the third stage system 112. The package 210 may include a physical product as discussed for the package 206 transferred from the first stage system 102 to the second stage system 110. The third stage system 112 can then confirm the IIO by decoding the image to form a bitstream, and exchanging information 212 with the identifying object registry 108, including the bitstream, for confirmation of the IIO. As discussed herein, the techniques are not limited to only three workflow stages, but may include any number of workflow stages, both in series and in parallel.

In an example, the arrows 206 and 210 may not be included in the block diagram 200, and the identifying object registry 108 may send an IO image from an optical IO reader 104 to each workflow stage 102, 110, and 112 separately, as indicated by arrows 202, 208, and 212, respectively. This may be the case, for example, if only one workflow stage is to be performed each time an IO is imaged by an optical IO reader 104. For example, a customer may image an IO with an optical IO reader 104 and send it to the identifying object registry 104. The identifying object registry 104 may then send the IO image to a first workflow stage 102 to be analyzed for existing customer loyalty information and updated to include progressive information. At this stage, if existing customer loyalty information is found within the IO, it is confirmed that the IO is an IIO. Otherwise, the IO may be updated to an IIO by adding progressive information relating to customer loyalty. Then, the next time the IIO is imaged, it may be sent to a second workflow stage 110 to be analyzed for additional customer loyalty information and updated to include further progressive information. This may be repeated any number of times, and the customer's profile may be continuously updated to include additional customer loyalty information. This type of workflow may be particularly useful for progressively updating customer loyalty information every time a particular customer purchases a product from a company, or for tracking customer loyalty information based on how often a particular customer purchases a certain product from a store or restaurant.

In an example, a two-dimensional or three-dimensional IIO that is created may be used for two purposes, i.e., a point of sale and mass serialization for the colors. In other words, the IIO may be used as a traditional IO and an IIO at the same time because it effectively combines a static (or traditional) IO and dynamic (or progressive) IIO into one multi-dimensional IIO. In addition, in an example, a two-dimensional or three-dimensional IIO may be used for a variety of workflows, including a multi-person composite document.

As described herein, the identifying object registry 108 can include hardware, such as processors, memory, and storage. Further, the identifying object registry 108 and each of the workflow stage systems 102, 110, and 112, may include software for generating an IIO. In an example, access to the identifying object registry 108 may be secure, for example, requiring a login and password or other authorization methods, such as biometric validation of identity, possession of a secure token, and the like. In another example, the identifying object registry 108 may be unsecure, e.g., be publicly accessible.

In some examples, the system 100 may be hosted by a cloud computing network, which may be a virtualized bank of computers including servers that enable Internet-based computing. Shared resources, software, and information may be provided to various computing devices through the cloud computing network. The computing devices may include the workflow stage systems 102, 110, or 112, which may be stationary, such as desktop computers, or mobile, such as laptop computers, netbooks, cellular phones, personal digital assistants (PDAs), and the like. The cloud computing network may allow a registry system provider to deliver access to the identifying object registry 108 and its various services to subscribers online via another web service or software, such as a web browser. Software and data associated with the cloud computing network may be stored on servers and their associated memory.

Thus, as a result of the workflow described above, the IIO contains an incrementally increasing amount of information at each stage of the workflow. The information that is added to the IIO throughout the workflow may be related to customer loyalty data. In an example, every time a customer purchases a particular product online, the IIO associated with the product is updated online to keep track of how many times the customer has purchased that product. In this manner, a customer's loyalty to a particular company may be measured based on the number of times that a customer has purchased an item from the company. In another example, an IIO on an item in a store may be updated once a month to increase the information content of the IIO. Then a particular customer's loyalty to the store may be measured when a customer purchases a particular product by tracking whether the customer also purchased the same item during the previous months. The above cases are intended as non-limiting examples of ways in which IIOs, as described by the current method, may be used to track customer loyalty information.

Figure 3:
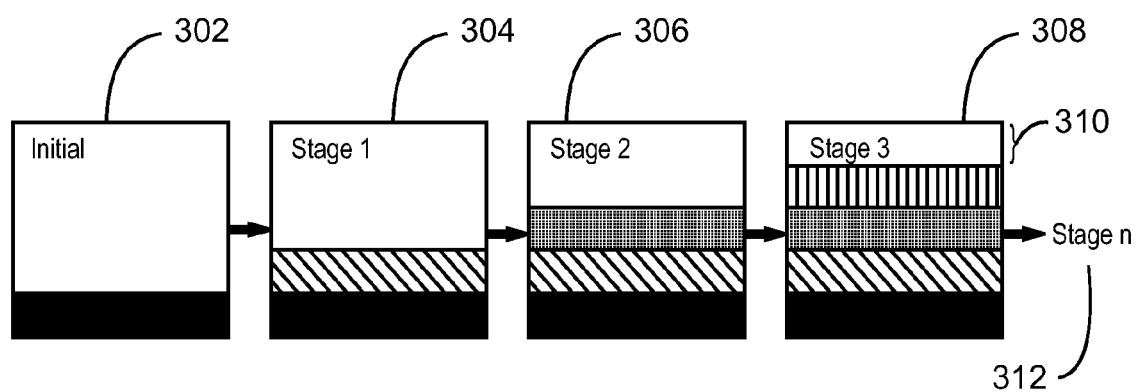
FIG. 3 is a schematic of forming an IIO from an IO during a workflow and adding additional information to the IIO, in accordance with an example.

FIG. 3 is a schematic 300 of forming an IIO from an IO during a workflow and adding additional information to the IIO, in accordance with an example. When formed, the IO can have an initial number of bits set to provide entropy to the code for the IIO, making it less probable that the code may be guessed. These entropy bits provide a first amount 302 of information in the IIO. At the completion of the first stage of the workflow at block 304, the IIO is overwritten to create a second IIO. The IIO then contains a second and increased amount of information, which is transferred to the second stage of the workflow. After completion of the second stage of the workflow, at block 306, the IIO has a third and further increased amount of information. At block 308, the third stage of the workflow is completed, and the IIO contains a fourth amount of information. A portion 310 of the bits that may be written are left blank in the IIO, providing entropy for the final IIO.

In an example, the amount of progressive information contained in an IIO is changed at a stage 304, 306, or 308, to accommodate a change in the workflow. More information may be added to the IIO at further stages 312, until the maximum amount of information has been encoded in the IIO.

Figure 4:
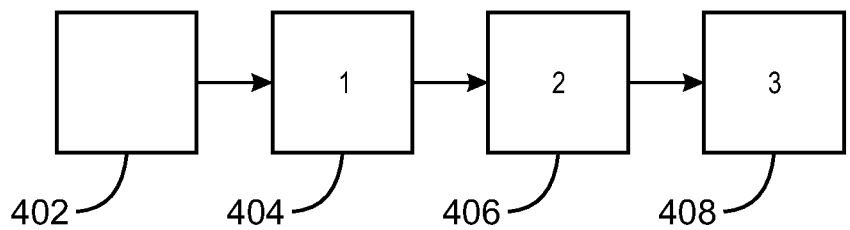
FIG. 4 is a schematic illustrating the use of a multi-level gray or color scale to increase the information content of a single tile, in accordance with an example.
Figure 4:
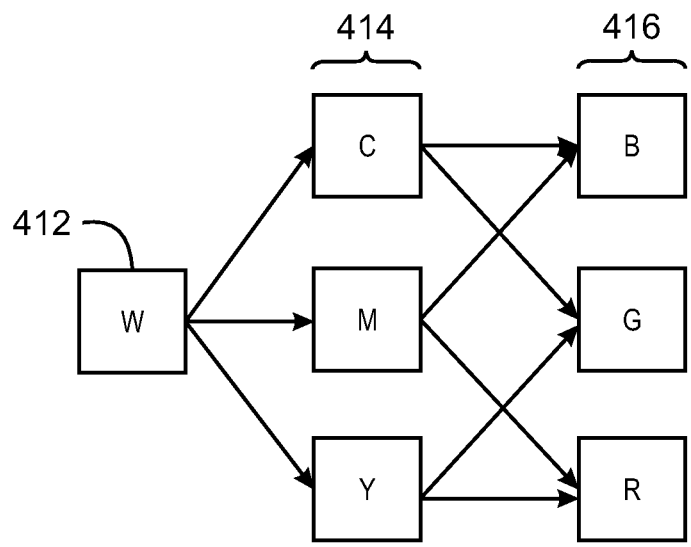

FIG. 4 is a schematic 400 illustrating the use of a multi-level gray or color scale to increase the information content of a single tile 402 or 412, in accordance with an example. In FIG. 4(A), each time a bit value of one is written to the tile, the grayscale intensity may be increased by 25%, for example, going from white to 25% gray at the first bit, as indicated by the second tile "1" 404. Another bit value of one may increment the intensity to 50% gray for the second bit in a third tile "2" 406, to 75% gray for the third bit in a third tile "3" 408.

The use of the grayscale changes the IO to a three dimensional IIO. It can be noted that the grayscale values are not limited to four intensity levels, as any number of intensity levels may be used, so long as they can be clearly distinguished. In general, N possible states for a single tile may store $\log(N)/\log(2)$ bits in that tile.

A similar increase in information content may be realized by using a color scale, as shown in FIG. 4(B). In this example, a white tile may encode a bit value by being changed to any one of a first set 414 of colored tiles, e.g., a cyan tile "C", a magenta tile "M", or a yellow tile "Y". The colors for the first set 414 of tiles may be adjusted to reach more complex colors in a second set 416, for example, by overlaying a tile in the first set 414 with different tones or hues. Thus, a C colored tiled in the first set 414 may be adjusted to be either a blue "B" tile or a green "G" tile in the second set 416. Similarly, an M colored tile may be adjusted to be either a B colored tile or a red "R" colored tile in the second set and a Y colored tile may be adjusted to be either a G colored tile or an R colored tile.

As for the grayscale tiles, the use of the colored tiles changes the IO to a three-dimensional IIO. Although seven colors are shown, any number of colors may be used, so long as they may be clearly distinguished by the imaging device. As the seven different colors may encode seven bits, the information density of the IIO increases by a factor of $\log(7)/\log(2)$.

In examples, the amount of information stored in an IO is changed by converting a binary IO, e.g., using dark and light tiles, to a grayscale or color IIO by writing different colors or intensities. The addition of very light gray or color scales to an IO may be useful for conveying progressive information. Therefore, it may be desirable to use gray or color scales that are not clearly distinguishable by the imaging device, but are only distinguishable by a software program. As used herein, a software program is a set of computer-readable instructions that direct a processor to perform specific functions. In this way, another plane of information content is added to the IO in the form of progressive color scales without altering the overall identity of the IO. In an example, an IO and an IIO generated from the IO may be interpreted as identical according to a standard, commercially-available optical IO reader. However, when analyzed by a specialized software program, it may become apparent that the IIO has a much higher degree of information content than the IO.

Figure 5:
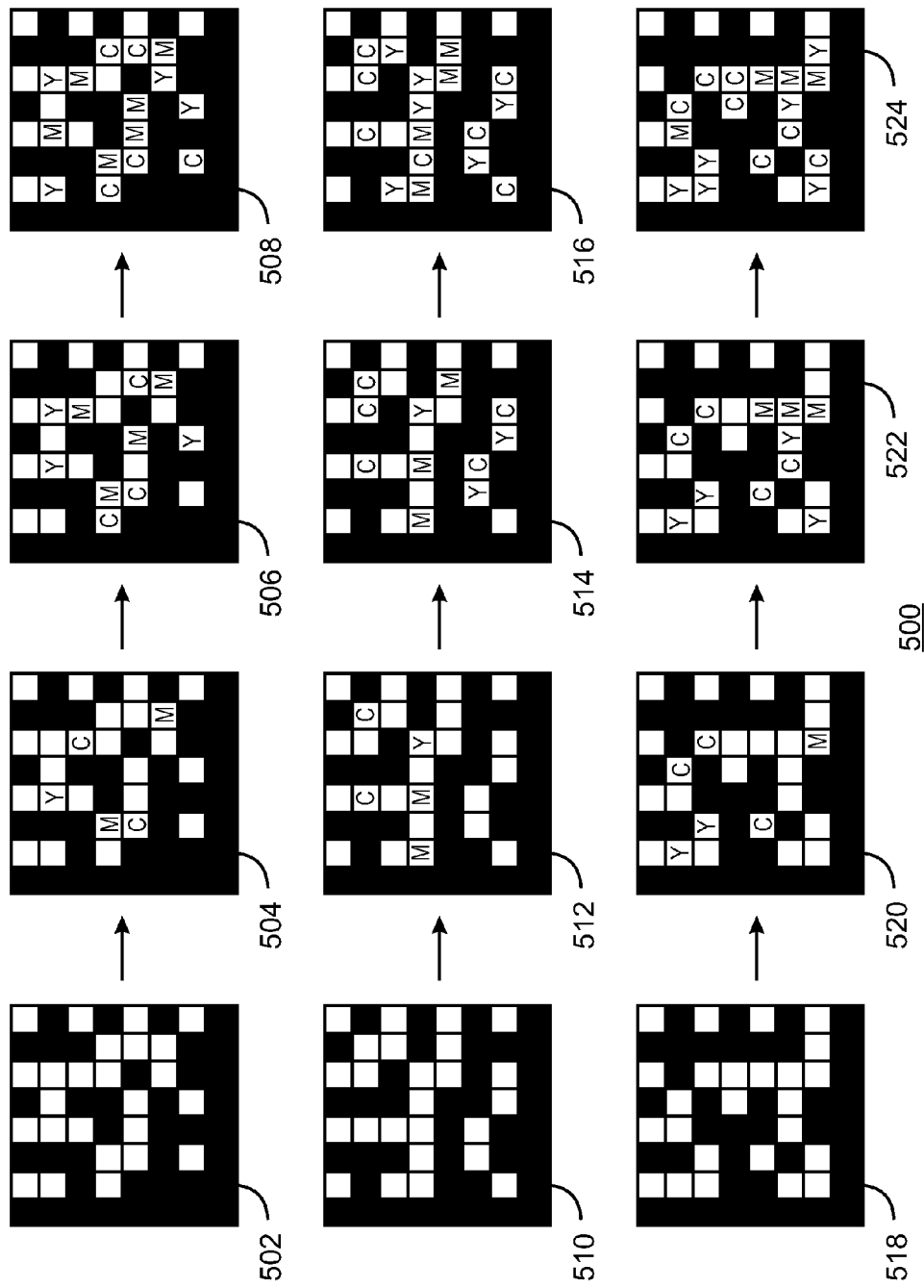
FIG. 5 is a schematic illustrating examples of generating a two-dimensional IIO from an IO, in accordance with examples.

FIG. 5 is a schematic 500 illustrating examples of generating a two-dimensional IIO from an IO. The columns indicate the progression along a workflow. The first IO 502 on the top row is progressively changed by sequentially overwriting light, saturated colors onto the white tiles. In this example, the progressive colors include light yellow, "Y," light cyan, "C," and light magenta, "M." The IIO's created from the first IIO 502 on the top row are 504, 506, and 508. The first IO 510 on the middle row is progressively changed to obtain the IIO's 512, 514, and 516. The first IO 518 on the bottom row is progressively changed to obtain the IIO's 520, 522, and 524. The IIO's that are obtained may still be read by a 2D optical IO reader to give the code for the IO's. For instance, in the case of light, saturated colors overwritten on white tiles, the optical IO reader will still interpret those tiles as "white" because there is a negligible difference in intensity between the colored tiles and the white tiles. The progressive information may only be recognized by a software program. Therefore, from the perspective of a standard optical IO reader, the IO and respective IIO's are identical throughout the entire progression of the workflow. In an example, a progressive bitstream may be written using a color scale to overwrite a two-dimensional IO and create a three-dimensional IIO. In another example, a progressive bitstream may be written using a color scale to overwrite a one-dimensional IO and create a two-dimensional IIO. In another example, a three-dimensional IIO may be overwritten with an additional progressive bitstream to accommodate an increased amount of progressive information.

The location of the IO, which may be referred to as the "point of display" (PoD), may be a store, restaurant, periodical, online website, or any other location. This IO may be progressively updated over time at the PoD according to the owner's preference. In an example, the IIO may be updated every time a particular customer purchases a product or other readily-messaged printer mark. In other examples, the IIO may be updated on other periods, for example, each day at a coffee shop, each week at a restaurant, or each month for a magazine or other periodical. The customer may simply take a picture of the IO using a mobile device. The IO may then be decoded into its non-payload indicia, 2D IO indicative tiles (i.e. the black tiles), if present, and finally the loyalty data carrying tiles or LDCTs. The LDCTs are the progressive non-back, non-border tiles, which carry the progressive customer loyalty information. The LDCTs consist of very light-colored tiles that may be recognized as progressive tiles by a software program or advanced optical IO reader, but are recognized as standard white tiles by a traditional optical IO reader.

In an example, the incremental 1's in the binary representation of the LDCTs are computed from the previous IIO imaging operation. This may be explained, for example, using the three cases, or rows, in FIG. 5. In FIG. 5, let each LDCT represent two bits, where white={00}, yellow={01}, cyan={10} and magenta={11}. Since there are only 18 LCDTs per IIO, the total number of bits held in these relatively simple examples is 36 (i.e., 18 tiles×2 bits/tile). The three rows are next considered.

In FIG. 5, the four barcodes 502, 504, 506, and 508 in the top row represent, in order:
1. 000000000000000000000000000000000000
2. 000100000010001100001000000000000000
3. 000100000010001100001000010010000011
4. 000100110010001110111000010010010011

The above strings represent the four barcodes in the top row, decoded from left to right and from top to bottom. Also, it should be understood that only the non-black, non-border tiles are included in the above strings. Since the first barcode is white only, i.e., does not contain any progressive information, the original sequence is simply 36 consecutive "0" bits.

As described herein, Hamming distance is the sum of bits, defined in the elements of the IIO that are different from one stage to the next. The Hamming distance between two sequences of bits, S(a) and S(b), or HD(S(a),S(b)), is given by Eqn. 1.

$$HD(S(a),S(b)) = \Sigma_{i=1}^{L} S(a) \otimes S(b)$$  Eqn. 1

In Eqn. 1, $\otimes$ is the bit-wise XOR operator. Therefore, in this example, HD(1.,2.)=5 HD(2.,3.)=4 and HD(3.,4.)=6 by making changes of "0" to a "1". In the example, conversion of "yellow" or "cyan" to "magenta" is allowed for the top row. In other words, "01" or "10" may be converted to "11", which affords the greatest possible number of changes of "0" to "1," i.e., 36 in all. By the fourth barcode, we still have 21 "0"'s remaining. However, the middle and bottom rows represent a different situation.

In FIG. 5, the four barcodes 510, 512, 514, and 516 in the middle row represent, in order:
1. 000000000000000000000000000000000000
2. 100010000001100110001000000000000000
3. 100010000100110011110110000000000011
4. 100010000100110011110110011110000011

In the middle row, unlike the top row, conversion of {01} or {10} to {11} is not allowed. In other words, once a "yellow" or "cyan" has been printed, it cannot be converted to "magenta". Because of this, options on remaining tiles exhaust faster than for the top row. However, this approach is more amenable to an overprinting approach, as discussed below. For the middle row, HD(1.,2.)=7, HD(2.,3.)=6 and HD(3.,4.)=4 by making changes of "0" to a "1".

In FIG. 5, the four barcodes 518, 520, 522, and 524 in the bottom row represent, in order:
1. 000000000000000000000000000000000000
2. 010010000111000010000000000000001100
3. 010010000111100010010000000000011111
4. 011110000111100010010100001000011111

For the bottom row, like the middle row, conversion of {01} or {10} to {11} is not allowed. In other words, conversion of a "yellow" or "cyan" to "magenta" is not allowed. For the bottom row, similarly to the top and middle rows, HD(1.,2.)=8, HD(2.,3.)=5 and HD(3.,4.)=4 by making changes of "0" to a "1".

In an example, if the customer loyalty IIO is implemented as an overprinted barcode, the available changes in color of each tile for each stage are different. An overprinted IIO is one in which each successive state is the result of adding new colors on top of tiles that may already be colored. For overprinting, it is not possible to change a tile from "yellow" to "magenta" by overwriting "cyan" onto the yellow tile, as discussed above with relation to the top row of IIO's. Instead, "green" would be used in place of "magenta," since overprinting "yellow" with "cyan" produces "green." The determination of whether overprinting is allowed may be made by the particular company that is utilizing the IIO and may be used as an additional security measure, since the company will know what to expect in terms of the progression of tile colors.

It should be noted that the IO patterns, e.g., the dark tiles, are not affected by the information added to the lighter tiles. Accordingly, transitions to fully black are not permitted, as such transitions would change the code of the base, or initial, IO.

Figure 6:
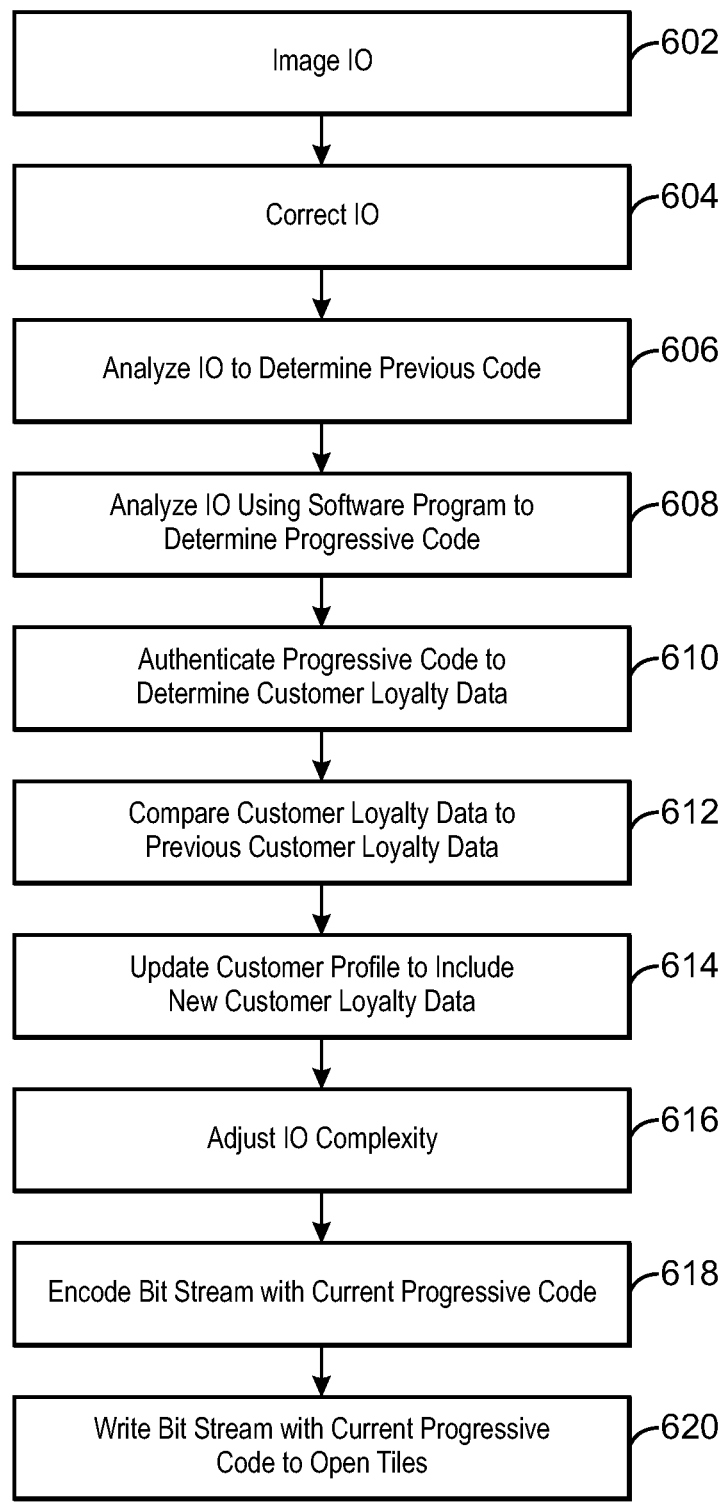
FIG. 6 is a flow diagram of a method for tracking customer loyalty information using an IIO, in accordance with examples.

FIG. 6 is a flow diagram of a method 600 for tracking customer loyalty information using an IIO. Referring also to FIG. 1, prior to configuring the system 100 and its various components to generate an IIO, the expected number of stages in the workflow can be set and a number of bits to write in total and during each state of the workflow can be selected. In some instances, however, the number of stages in the workflow may not be known prior to configuring the system 100, and the number of bits may be dynamically determined at any stage in the workflow. For example, if additional bits need to be added for security at a stage of the workflow that takes place outside of a secure environment. In one example, an IO may be selected first and then the workflow and number of bits may be designed around the selected IO. In an example, the information density of the IO may be adjusted by changing the number of colors or intensity levels allowed in the IO to accommodate a change in the number of stages, security needs, and the like.

In examples in which the IO is selected after the total number of bits is identified, the identifying object registry 108 may consider the total number of bits to be written to the IO and whether it is desirable to include entropy in the identifying object. At this stage, other considerations may also be taken into account, such as to include non-payload indicia in the identifying object, the number of code regions to be used to form the new IIO, and the relationships between the code regions.

The probability of guessing the initial state with less than a specified statistical probability may be added prior to the initiation of the workflow by partially filling available tiles of the IO. It can be understood that a partially completed state of the IIO has greater security, statistically, than an all-white state of the IO.

The introduction of non-payload indicia (NPI) may also affect the size of the IO because non-payload indicia are included in tiles of the IO that may have otherwise been written to with bits. As described above, NPI do not contain bits, but rather are used for calibration, for example, to correct skew, calibrate intensity, and calibrate orientation of the IO, at each stage in the workflow. NPI may also be used for branding, symbology identification, or the like. When it is desirable to include NPI, the number of tiles to be used for the NPI may be accounted for in the total number of tiles that are used for the IIO.

In one example, the IO, the code regions, the workflow, and the number of bits are created at the identifying object registry 108. The identifying object registry 108 includes a non-transitory, computer-readable medium with a computer program for selecting the IO, a number of stages in the workflow, a security level for each stage in the workflow, and a number of bits to be written at each stage in the workflow. The number of elements may be preselected before the workflow is initiated or dynamically determined as the workflow is in progress.

The workflow and preset number of bits may be set or defined using information received at the identifying object registry 108 from participants in the workflow. For example, a company owner may request that a workflow be set up to encode customer loyalty or coupon information into an IIO on a particular product. The identifying object registry 108 may then select a suitable IO, generate a suitable workflow, and preset code region information to be stored in the IIO. The IIO design and the preset number of bits may also be set by the workflow and, thus, can be accessed (or looked up) using a number of methods.

As described herein, the number of bits to write to the IO at each stage of the workflow is proportional to the desired minimum level of security, on a statistical basis, at any given stage. High-level security stages may write more bits of information to the IO, while low-level security stages may write less bits of information to the IO. The number of bits to encode at each stage of the given workflow may be based on probability. For example, the number of bits can be chosen so that a given level of confidence is achieved so that the next state of the IO has less than a p probability of being guessed. Hamming distance may also be used in the determination of the number of bits.

Once the workflow is generated, including the various stages and the number of bits to be encoded in total and at each stage, and the IO is selected, the workflow is initiated. The workflow instructions may be transmitted electronically to at least the first stage system 102. The instructions may include, for example, the procedural rules for the transmission of the product, the actions, or purposes associated with the product, and either the total number of bits to encode or the number of bits to encode in the product's IIO at each stage in the workflow.

In one example, the systems used during subsequent stages in the workflow receive the instructions from the first stage system 102 or from a system used in previous workflow stage. In another example, the systems 110 or 112 used during subsequent stages in the workflow may retrieve the instructions from the identifying object registry 108, for example, via a network 106. In another example, the workflow may be initiated without transmitting the workflow instructions. For example, the document and its associated IO or IIO may be transmitted to the first stage system 102 in the workflow. It is to be understood that as long as the starting point of the workflow is known, one can deduce each stage of the workflow.

The method starts at block 602 by imaging an IO. The imaging may be performed by a standard optical IO reader 104, a software object or advanced optical IO reader 132, a scanner, a camera, or any other suitable imaging device or code. The IO is isolated or segmented from the surrounding content, such as by the use of non-payload indicia (NPI) that delineate the edges of the IO. At block 604, an image correction and calibration is performed. Calibration may involve orienting the IO using the non-payload indicia, dewarping the IO, deskewing the IO, calibrating the possible intensity levels, and the like. The calibration may be performed in conjunction with interpretation of the IO, or calibration may be performed and then interpretation of the IO may be performed.

At block 606, the image may be analyzed to determine the previous code in the IO. The codes may then be identified by incrementally determining the bits written to the tiles to generate a bitstream. For example, the bitstream may be determined by reversing a procedure used to write the bits. The bitstream may then be decoded using a public key to decode a bitstream encoded with a corresponding private key. Any number of techniques may be used to encode and decode the data between workflow stages, including the private/public key system, generation of an encoded numerical hash of the code, and the like. Further, in some examples, an identifying object registry 108 may be used to confirm the bitstream without further decoding, such as if the IO effectively stored a secret string, nonce, or the like.

At block 608, the image may be analyzed using a software program to determine the progressive code in the IO, if any exists. At block 610, the progressive code may be authenticated, or confirmed, to validate the identity of the document, or product, and the previous stage. In addition, the authentication of the progressive code may be performed to determine the customer loyalty data obtained within the IIO. For example, this may be performed by querying the identifying object registry 108 with the bitstream. In some examples, the confirmation may be performed by comparing the decoded value to an expected value at a local stage system.

At block 612, the customer loyalty data obtained from the IIO image may be compared to previous customer loyalty data for the same customer. This may be used to determine how often the customer buys products from the company, what types of products the customer typically buys, or any other customer information. The previous customer loyalty data may be obtained from a customer's online profile for the company or any other type of customer tracking system that has been put into place by the particular company. In addition, the customer loyalty data may be used to distribute rewards to the customer for their loyalty, such as a points program, coupons, gift cards, or any other form of reward.

At block 614, the customer loyalty information may be updated in the customers profile or online account, or the customer tracking system of the particular company, to reflect the new information. The company may then retain this information in order to allow for easier tracking of loyal customers' preferences and spending habits. In addition to providing customers with a way of being rewarded for loyalty to a particular company, the company may also be rewarded with loyal customers. Therefore, the current method may be beneficial from the viewpoint of both the customers and the company.

In an example, when the customer captures the IO, it is decoded and compared to the current decoded version stored on the user's device, in the store, or in the user's online profile or account. In order to determine a match, the Hamming distance should be correct for the incremental step and the previous colors should match. The user sends the previous signal and the current signal. The point of support computes the Hamming distance and sends an encrypted version of the new signal, which will now represent the old signal. If the Hamming distance is a discrete, or integer, multiple of the previous state-state difference, the user is awarded one unit of loyalty. This "new signal" is cryptographically secured through encryption, nonce substitution, etc., in the back end database.

At block 616, the IO may be adjusted to increase the information content by adding new, progressive information. The adjustment may be performed by adding very light, saturated colors to the IO, increasing the number of colors in the IO, or adding grayscale tiles to the IO. In another example, light, saturated colors within an IIO may be overwritten with additional light, saturated colors to store more progressive information within the IIO. Furthermore, any combinations of these techniques may also be used to increase the information density of an IIO. This additional progressive information may reflect new customer loyalty information.

Once the complexity of the IO has been adjusted, at block 618, a new bitstream may be generated, for example, related to the current workflow stage. The new bitstreams may include an encrypted version of a hash, for example, generated using a private key. In some examples, a new bitstream for a progressive code is obtained from an identifying object registry 108 along with instructions for writing the more complex IIO.

At block 620, the new bitstream with the progressive code may be written over the IO. The stage system 102, 110, or 112 performing the incremental writing may determine the location of remaining available candidate areas that can be written to, for example, tiles that are not already carrying NPI or are not full. The open tiles may include tiles generated by an increase in the complexity of the IO. A variety of mathematical techniques may be used to determine where to place the information, which may include a preset number of bits. Non-limiting examples of these techniques include scrambling, random/nonce, one-time-pad, encryption, data replication, etc. These techniques identify where the information can be added to the IO. This may include identifying open tiles for data and writing the bitstream to the open tiles.

It should be understood that this flow diagram 600 is not intended to indicate that the steps of the method should be executed in any particular order, or that all of the steps of the method should be included in every case. For example, in some cases, the flow diagram 600 may end at block 614 with the updating of the customer's profile to include new customer loyalty data and not proceed to block 616. This may be the case if, for example, the company does not wish to adjust the IIO each time the customer purchases a product. The company may only wish to increase the information content of the IIO by performing the steps at blocks 616, 618, and 620 once every week or once every month, for example.

In one example, after the available candidate areas in the code region, or payload tiles, are identified, the first stage system 102 identifies or retrieves the preset number of bits, for example, from the workflow instructions, to be written. In some examples, the number of bits to be written at a particular stage may be determined automatically by the stage system 102, 110, or 112 performing the incremental writing or by a user. In these examples, the total number of bits to be encoded throughout the workflow is known, and the stage system 102, 110, or 112 at each workflow stage would add a suitable amount of information to the current IIO. For example, a string containing 0's and then 1's incrementally to be written could be stored as a nonce and then the 1's would be incrementally written to the IIO stage by stage. As described herein, in an example, additional information may be stored in the IO by increasing the complexity of the IO.

When determining how to write the information, the stage system 102, 108, or 110 will use the information from segmentation to identify the then-current intensity levels, color levels, and the like, of the available candidate areas in the IO. When determining how to write the information, the stage system 102, 108, or 110 will select a scrambling technique, if any, by identifying a mathematical technique to be used for incorporating the information for the current workflow stage. This technique may be random or nonce-based, or may be deterministic.

In instances where the workflow 200 is based on the identifying object registry 108, as discussed with respect to FIG. 2, the previous state of the IIO may be replicated using the network 106, so that random or nonce methods are valid when inputting new information. For example, the information to be added is provided by a random number generator and is stored in the identifying object registry 108. In this example, the newly added bits are randomly added, and the identifying object registry 108 can provide and store the random new bits.

When determining how to write the information, the stage system 102, 110, or 112 will also select a manner in which the state change results in a predictable change in the IO. In one example, this may be accomplished when a binary string representation of the current state of the IO is transformed with a security string, such as by using a private key to encrypt a binary string. When determining how to write the information, the stage system 102, 110, or 112 will also identify a writing scheme, which may be suitable for the then-current stage of the workflow. Further, the rules for increasing the complexity of the IO to increase the information density may be determined before the start of the workflow, so that the IIO encoding remains predictable after the complexity is increased.

The stage system 102, 110, or 112 performing the incremental writing at workflow stage I then writes the information to form a new IIO. When writing, the stage system 102, 110, or 112 may use the incremental intensity or color process, the selected scrambling technique, the selected manner for achieving a predictable state change, any rules for increasing complexity in the IO, and the selected writing scheme to write the information to the IO. During each writing stage in the workflow, previously written information is not generally removed or changed, but rather the additional information is added, changing the state of the current IIO.

While the number of bits to be written is preset in one example, the actually writing of the information may take place dynamically as the workflow progresses. As such, the candidate areas that are actually written to are determined in real time according to, in part, the areas available for writing, the number of bits to be written and the mathematical techniques to be used. In addition, the number of stages to be included in a workflow may be dynamically determined based, for example, on how often a particular customer purchases products from a certain company.

The product and the IO, such as a document, can be printed and stored. When the IO is completely physical, the document with the IO printed thereon as it was received can be overprinted so that the newly written areas will be filled in the printed version. When the IO is physical and electronic, the electronic version of the document and the incrementally written to IO can be reprinted or overprinted, if desired. When the incrementally written to IIO is saved, it is to be understood that it will replace any prior versions of the IIO.

The product and incrementally written to IIO are then shipped, electronically or physically, to the next entity in the workflow, such as workflow stage II system 110, as described with respect to FIG. 1. Similarly, when the action, task, etc. set forth in the workflow stage II instructions have been performed, the IIO is incrementally written to according to the workflow stage II instructions, for example, following the same method 600. The document and its incrementally-overwritten IIO can then be printed and stored by the stage three system 112, which adds its increment to the IIO.

At each stage, the previous states of the IIO are still provable, either because there are no new available candidate areas in the later stages of the IIO or because the rules used to increase the information content of the IIO are predetermined and, thus, predictable. In examples where the stage system 102, 110, or 112 at a stage in the workflow has access to all the rules governing writing at the previous stages, the stage system 102, 110, or 112 can automatically check all previous states of the IIO for validity when checking the then-current state.

In any of the examples disclosed herein, if multiple identifying objects are part of the same shipment, it may be desirable to have the same pre-filled set of data bits. In some examples disclosed herein, the IIO's retain a set amount of real estate on a document even though information is incrementally written thereto throughout a workflow. The state of the IIO and the then-current stage of the workflow may be determined directly from the intensity or color of the tiles and the percentage of the tiles that are filled in or saturated, even without knowing how to interpret the data embedded therein.

The method described by the flow diagram 600 may be applied for a variety of uses other than customer loyalty tracking. For example, any type of application in which it is desirable to use a quantitative method to keep track of repeated visits to a location or the progress of stages throughout a particular workflow, while retaining the ability to read the code for the IO, may benefit from this method. In an example, this method may be applied to the tracking of a package during the shipping process by progressively updating the package's IIO to reflect the stages of the process through which it has already passed. In another example, this method may be applied to the products at a coffee shop to track which drinks are the most popular by progressively altering the IIO on each drink according to the relative popularity of the drink. It should be understood that these are only a few non-limiting examples of possible applications for this method.

Figure 7:
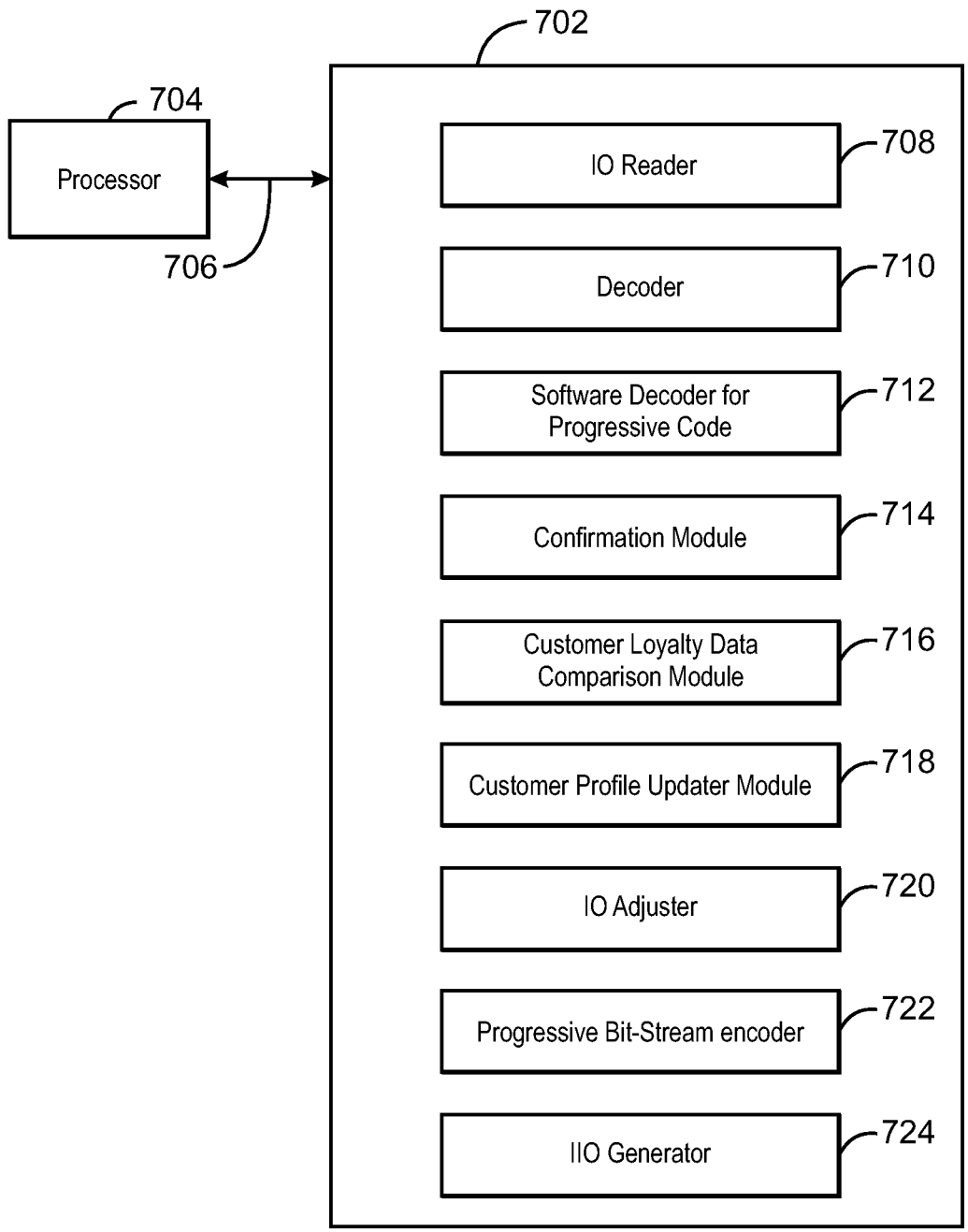
FIG. 7 is a block diagram of a non-transitory, computer readable medium containing code for tracking customer loyalty information using an IIO, in accordance with examples.

FIG. 7 is a block diagram 700 of a non-transitory, computer readable medium 702 containing code for tracking customer loyalty information using an IIO. A processor 704 may access the non-transitory, computer readable medium 700 over a bus 706, or other communication system, to obtain code to direct the processor 704 to confirm a product based on an IIO associated with the product. The non-transitory, computer readable medium 702 may include any combination of read only memory (ROM), random access memory (RAM), hard drives, optical drives, RAM drives, or flash drives.

The non-transitory, computer readable medium 702 may include a module 708 to read an IO and a second module 710 to correct the image and calibrate the reader. A decoding module 712 may use a software decoder to generate the progressive code for the IIO. A module 714 may confirm the progressive code, for example, by following the instructions that should have resulted in the current IIO, or by accessing an identifying object registry. A customer loyalty data comparison module 716 may be utilized to compare the customer loyalty data contained within the current progressive code with previous customer loyalty data from the customer's profile. A customer profile updater module 718 may be utilized to update the customer's profile to reflect the new customer loyalty data. Another module 720 may be used to adjust the IO, by increasing the amount of information contained within the IO through the use of color scales to increase the information density of the IO at each stage in a workflow. A progressive bit-stream encoder module 722 may generate the codes needed to create the IIO. Another module 724 may then identify open tiles in the code regions of the IO and overwrite the additional progressive information onto the IO.

What is claimed is:

1. A method for tracking customer loyalty information using an incremental information object (IIO), comprising:
capturing an information object (IO), wherein the IO comprises a plurality of tiles, and wherein the plurality of tiles comprise a standard code;

analyzing the IO to identify the standard code;
analyzing the IO to determine if the IO comprises an IIO containing a progressive code, wherein the progressive code does not interfere with the reading of the standard code; and
confirming the progressive code and, if the progressive code is successfully confirmed, obtaining customer loyalty data from the progressive code within the IIO.

2. The method of claim 1, further comprising, if the progressive code is successfully confirmed, updating a customer profile to add new customer loyalty data.

3. The method of claim 1, further comprising, if the progressive code is successfully confirmed:
generating a new progressive code comprising a bitstream; and
overwriting the bitstream on the plurality of tiles to create a new IIO.

4. The method of claim 3, wherein overwriting the bitstream on the plurality of tiles to create the new IIO comprises using color scales or grayscales to substitute dark, unsaturated color modules in place of black tiles in the IO.

5. The method of claim 3, wherein overwriting the bitstream on the plurality of tiles to create the new IIO comprises using color scales or grayscales to substitute light, saturated color modules in place of white tiles in the IO.

6. The method of claim 4, wherein the color scales or grayscales are used to encode customer loyalty data into the IO.

7. The method of claim 3, comprising writing the bitstream using a color scale or grayscale to overwrite a one-dimensional IO and create a two-dimensional IIO.

8. The method of claim 3, comprising writing the bitstream using a color scale or grayscales to overwrite a two-dimensional IO and create a three-dimensional IIO.

9. The method of claim 1, further comprising confirming that an IIO may be recognized as the IO by an optical IO reader and may be recognized as an IIO containing customer loyalty data by a software program.

10. The method of claim 9, wherein the optical IO reader comprises a handheld device, a mobile device, or a bar code reader to read the IO.

11. A system for tracking customer loyalty information using an incremental information object (IIO), comprising:
a processor; and
a memory, wherein the memory comprises computer readable code to direct the processor to:
capture an information object (IO), wherein the IO comprises a plurality of tiles, and wherein the plurality of tiles comprise a standard code;
analyze the IO to identify the standard code;
analyze the IO to determine if the IO comprises an IIO containing progressive code, wherein the progressive code comprises colors, intensities, or both that do not change the value of the standard code; and
confirm the progressive code, and, if the progressive code is successfully confirmed, obtain customer loyalty data from the progressive code.

12. The system of claim 11, wherein the memory comprises computer readable code further to direct the processor to update a customer profile to include new customer loyalty data.

13. The system of claim 11, wherein the memory comprises computer readable code further to direct the processor to confirm the progressive code, and, if the progressive code is successfully confirmed:
generate a new progressive code comprising a bitstream; and
overwrite the bitstream on the plurality of tiles to create a new IIO.

14. The system of claim 11, wherein the software program comprises any computer-implemented program to read the progressive code within the IO.

15. A non-transitory, computer readable medium comprising code to direct a processor to:
capture an information object (IO), wherein the IO comprises a plurality of tiles, and wherein the plurality of tiles comprise a standard code;
analyze the IO to identify the standard code;
analyze the IO to determine if the IO comprises an IIO containing progressive code, wherein the progressive code comprises colors, intensities, or both that are not recognizable by an optical IO reader; and
confirm the progressive code, and, if the progressive code is successfully confirmed, obtain customer loyalty data from the progressive code.

* * * * *